(12) United States Patent
Boehm et al.

(10) Patent No.: US 12,443,045 B1
(45) Date of Patent: Oct. 14, 2025

(54) DICHOPTIC DISPLAYS WITH OFFSET QUANTIZATION INCREMENTS TO ENHANCE PERCEIVED IMAGES THROUGH BINOCULAR FUSION

(71) Applicant: GOOGLE LLC, Mountain View, CA (US)

(72) Inventors: Alexandra E. Boehm, San Jose, CA (US); Björn Nicolaas Servatius Vlaskamp, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/631,401

(22) Filed: Apr. 10, 2024

(51) Int. Cl.
*G02B 27/01* (2006.01)
*G09G 3/00* (2006.01)

(52) U.S. Cl.
CPC ......... *G02B 27/0172* (2013.01); *G09G 3/001* (2013.01); *G02B 2027/0118* (2013.01); *G02B 2027/0132* (2013.01); *G02B 2027/0178* (2013.01); *G09G 2320/0233* (2013.01); *G09G 2320/0242* (2013.01); *G09G 2340/0407* (2013.01)

(58) Field of Classification Search
CPC ........ G02B 27/0172; G02B 2027/0118; G02B 2027/0132; G02B 2027/0178; G09G 3/001
See application file for complete search history.

(56) References Cited

U.S. PATENT DOCUMENTS

| 2012/0308134 | A1 | 12/2012 | Zhai et al. | |
| 2014/0055447 | A1 | 2/2014 | Wong et al. | |
| 2015/0187284 | A1* | 7/2015 | Fang | G09G 3/3614 345/690 |
| 2020/0051483 | A1* | 2/2020 | Buckley | G09G 3/002 |

(Continued)

FOREIGN PATENT DOCUMENTS

EP 4115795 A1 * 1/2023

OTHER PUBLICATIONS

Chen, Z. et al., "Changes in Binocular Color Fusion Limit Caused by Different Disparities", IEEE Access, 7; May 24, 2019; pp. 70088-70101.

(Continued)

*Primary Examiner* — Brent D Castiaux (57) ABSTRACT

Dichoptic displays with staggered quantization increments produce enhanced perceived images through binocular fusion. Different luminances or intensities and/or different colors are displayed to different eyes using staggered quantization increments and a separate display for each eye in order to produce an improved perceived image compared to the quality of an image that can be produced by either of the individual displays. Offsetting and staggering the quantization increments for luminances and/or colors in a dichoptic display enables the leveraging of binocular fusion to take advantage of a "winner take all" (for luminance) or averaging (for colors or chromaticities) phenomenon in human vision. Using the techniques described herein, two n-bit displays that display different images to individual eyes (Continued)

using staggered quantization increments can be utilized to produce a perceived image having approximately 2n−1 bit-depth.

20 Claims, 10 Drawing Sheets

(56) References Cited

U.S. PATENT DOCUMENTS

2023/0021443 A1    1/2023  Rodriguez et al.
2023/0136987 A1    5/2023  Morris et al.

OTHER PUBLICATIONS

Ding, J. et al., "Binocular Combination of Luminance Profiles", Journal of Vision 2017; 17(13):4; Nov. 2017; https://doi.org/10.1167/17.13.4; pp. 1-32.

Kingdom, F. et al., "Dichoptic color saturation mixture: Binocular luminance contrast promotes perceptual averaging", Journal of Vision 2015; 15(5):2; Apr. 2015; https://doi.org/10.1167/15.5.2; pp. 1-15.

* cited by examiner

DICHOPTIC DISPLAYS WITH OFFSET QUANTIZATION INCREMENTS TO ENHANCE PERCEIVED IMAGES THROUGH BINOCULAR FUSION

BACKGROUND

In head-mounted displays (HMDs), light from an image source is coupled into a lightguide substrate, generally referred to as a waveguide, by an optical input coupling element, such as an in-coupling grating (i.e., an "input coupler" or "incoupler"), which can be formed on a surface, or multiple surfaces, of the substrate or disposed within the substrate. Once the light beams have been coupled into the waveguide, the light beams are "guided" through the substrate, typically by multiple instances of total internal reflection (TIR) or by a coated surface(s). The guided light beams are then directed out of the waveguide by an output optical coupling (i.e., an "output coupler" or "outcoupler"), which can also take the form of an optical grating (e.g., a diffractive, reflective, or refractive grating). The output coupler directs the light at an eye relief distance from the waveguide, forming an exit pupil within which a virtual image generated by the image source can be viewed by a user of the display device. In many instances, an exit pupil expander, which can also take the form of an optical grating, is arranged in an intermediate stage between the input coupler and output coupler to receive light that is coupled into the waveguide by the input coupler, expand the light, and redirect the light towards the output coupler.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Waveguides often exhibit low luminous efficiency, and optimizing a waveguide design to have higher efficiency often results in color and luminance non-uniformities when the waveguides are utilized in a display system. Compensating for the non-uniformities typically involves the use of calibration algorithms that reduce available light as well as the available bit-depth for displayed imagery, as it is often necessary to reduce the bit-depth to improve the quality of the display. This reduction in bit-depth can result in abrupt transitions between luminances or intensities, creating bands or stripes instead of a smooth gradient in the displayed imagery and thus potentially significantly limiting the quality of the imagery provided to a user through the waveguide. As described further hereinbelow, these issues can be mitigated by displaying different imagery to each eye of a user, e.g., through one or more waveguides.

FIGS. 1-13 illustrate various techniques for producing dichoptic displays (i.e., displays that are different for each of a user's two eyes) with staggered quantization increments to enhance perceived images through binocular fusion. Aspects of the present disclosure are directed to displaying different luminances or intensities and/or different colors to each of a left eye and a right eye of a user using staggered quantization increments and a separate display for each eye in order to produce an improved perceived image compared to the quality of an image that can be produced by either of the individual displays. Offsetting and staggering the quantization increments for luminances and/or colors in a dichoptic display enables the leveraging of binocular fusion, the process by which the brain gathers information received from each eye separately and forms a single, unified image, to take advantage of a "winner take all" (for luminance) or averaging (for colors or chromaticities) phenomenon in human vision. Using the techniques described herein, two n-bit displays that display different images to individual eyes using staggered quantization increments can be utilized to produce a perceived image having approximately 2n–1-bit depth.

A dichoptic display generally displays different images to each eye, typically simultaneously. By presenting distinct images to each eye using staggered quantization increments that differ or are offset between individual displays for each eye, dichoptic displays can be utilized to produce enhanced perceived imagery that would not otherwise be able to be displayed using non-staggered quantization increments.

Quantization increments refer to the discrete steps or levels used to represent otherwise continuous values, such as luminance or color, in a digital system. In the context of digital image processing, quantization involves converting continuous analog values into discrete digital values. The size of these discrete steps or intervals is known as the quantization increment.

For luminance or color quantization, the quantization increment determines the level of precision in representing brightness or color intensity. Smaller quantization increments result in a more fine-grained representation but require more bits for encoding, leading to, e.g., increased file sizes, increased processing requirements, and increased bandwidth requirements. On the other hand, larger quantization increments provide coarser representations with reduced precision but can result in smaller file sizes, lower processing requirements, and reduced bandwidth requirements. When representing colors in an image, each color channel (e.g., red, green, and blue in an RGB image) is assigned a specific number of bits to represent the range of possible values. The quantization increment is determined by the number of bits assigned to each channel. For example, an 8-bit color channel allows for $2^8$ (256) quantization levels, while a 12-bit color channel allows for $2^{12}$ (4096) levels, providing more precision but requiring more storage space.

Calibration is typically required for display systems, particularly when waveguides are utilized, such as is often the case in augmented reality (AR) and mixed reality (MR) devices, to compensate for undesirable characteristics or asymmetries of the display, such as color fringing (e.g., visible color edges or halos around objects, particularly in high-contrast areas). After performing such a calibration, the bit-depth of images the display is capable of producing can be significantly limited, as it may be necessary to give up some bit-depth to improve the quality of the display. However, even when bit-depth is sacrificed in order to improve the quality of a display due to calibration, to reduce processing requirements, or otherwise, as described hereinbelow, enhanced perceived images can be produced by using dichoptic displays with staggered quantization increments and leveraging binocular fusion, i.e., the process by which the brain combines visual information from both eyes to create a single, unified perceived image.

Figure 1:
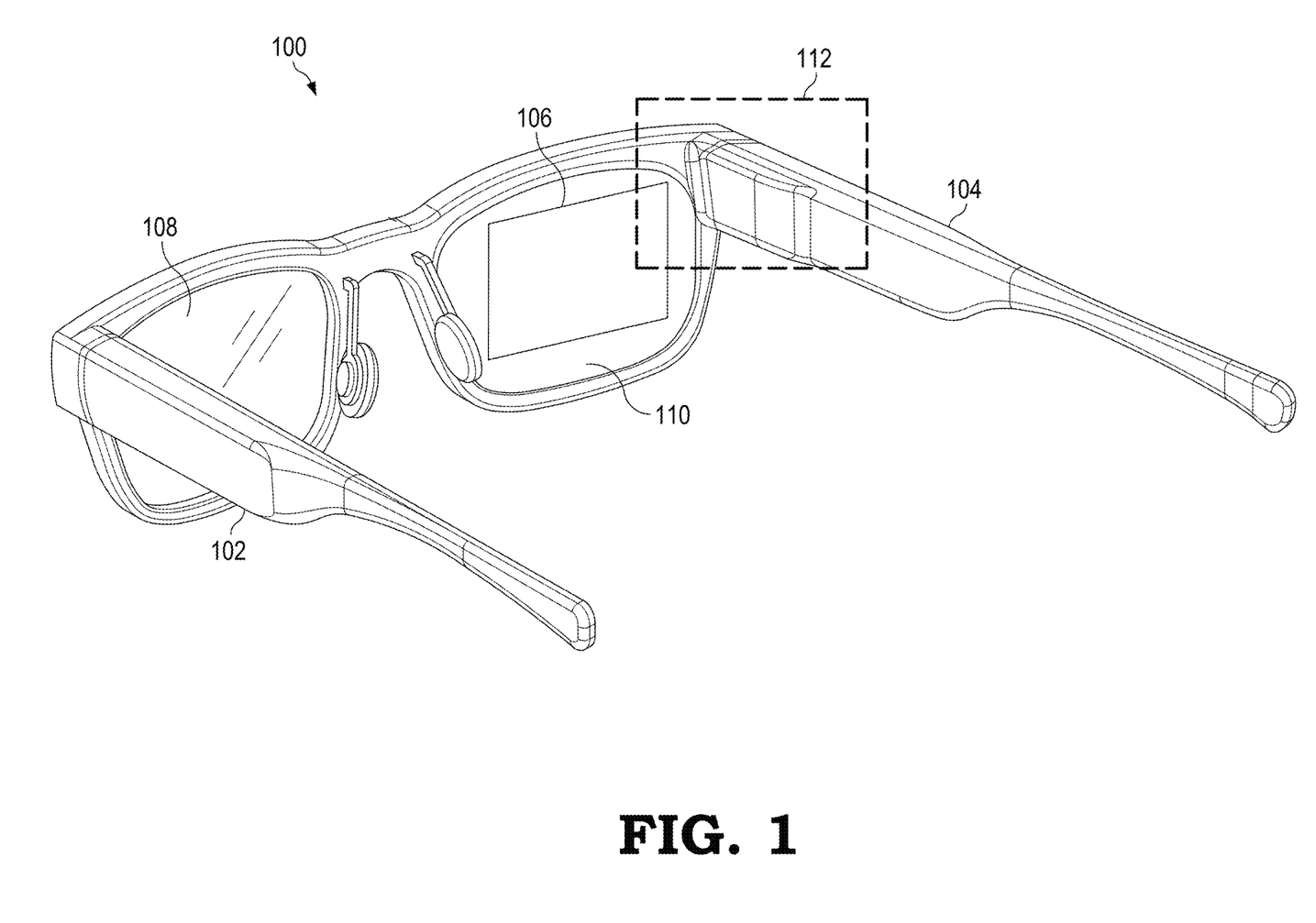
FIG. 1 shows an example display system that can be used to implement dichoptic displays with staggered quantization increments to enhance perceived images through binocular fusion in accordance with some embodiments.

FIG. 1 illustrates an example display system 100 capable of implementing dichoptic displays with staggered quantization increments to enhance perceived images through binocular fusion in accordance with some embodiments. It should be understood that the waveguide configurations of one or more embodiments are not limited to display system 100 of FIG. 1 and apply to other display systems. In at least some embodiments, the display system 100 comprises a support structure 102 that includes an arm 104, which houses a light engine configured to project images toward the eye of a user such that the user perceives the projected images as being displayed in a field of view (FOV) area 106 of a display at one or both of lens elements 108, 110. In the depicted embodiment, the display system 100 is a near-eye display system in the form of an eyewear display device that includes the support structure 102 configured to be worn on the head of a user and has a general shape and appearance of an eyeglasses frame. The support structure 102 includes various components to facilitate the projection of such images toward the eyes of the user, such as light engines, optical scanners, and/or waveguides. In at least some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a Wireless Fidelity (WiFi) interface, and the like.

Further, in at least some embodiments, the support structure 102 includes one or more batteries or other portable power sources for supplying power to the electrical components of the display system 100. In at least some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments, the display system 100 may have a different shape and appearance from the eyeglasses frame depicted in FIG. 1.

In some embodiments, both of the lens elements 108, 110 are used by the display system 100 to provide an AR or MR display in which rendered graphical content is superimposed over or otherwise provided in conjunction with a real-world view as perceived by the user through the lens elements 108, 110. For example, for each eye, display light used to form a perceptible image or series of images may be projected by a light engine of the display system 100 onto the eye of the user via a series of optical elements, such as a waveguide formed at least partially in the corresponding lens element, one or more scan mirrors, and/or one or more optical relays. Thus, the lens elements 108, 110 each include at least a portion of a waveguide that routes display light received by an input coupler, or multiple input couplers, of the waveguide to an output coupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment. However, in some embodiments, the lens elements 108, 110 are used by the display system 100 to provide a fully immersive virtual display with or without any real-world view, which may not require the use of any waveguides.

In at least some embodiments, the light engine is a matrix-based projector, a digital light processing-based projector, a scanning laser projector, or any combination of a modulative light source such as a laser or one or more light-emitting diodes (LEDs) and a dynamic reflector mechanism such as one or more dynamic scanners or digital light processors. The light engine, in at least some embodiments, includes multiple micro-LEDs. The light engine is communicatively coupled to a controller and a non-transitory processor-readable storage medium or memory storing processor-executable instructions and other data that, when executed by the controller, cause the controller to control the operation of the light engine. In at least some embodiments, the controller controls a scan area size and scan area location for the light engine and is communicatively coupled to a processor (not shown) that generates content to be displayed at the display system 100. The projector scans light over a variable area, designated the FOV area 106, of the display system 100. The scan area size corresponds to the size of the FOV area 106, and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

Figure 2:
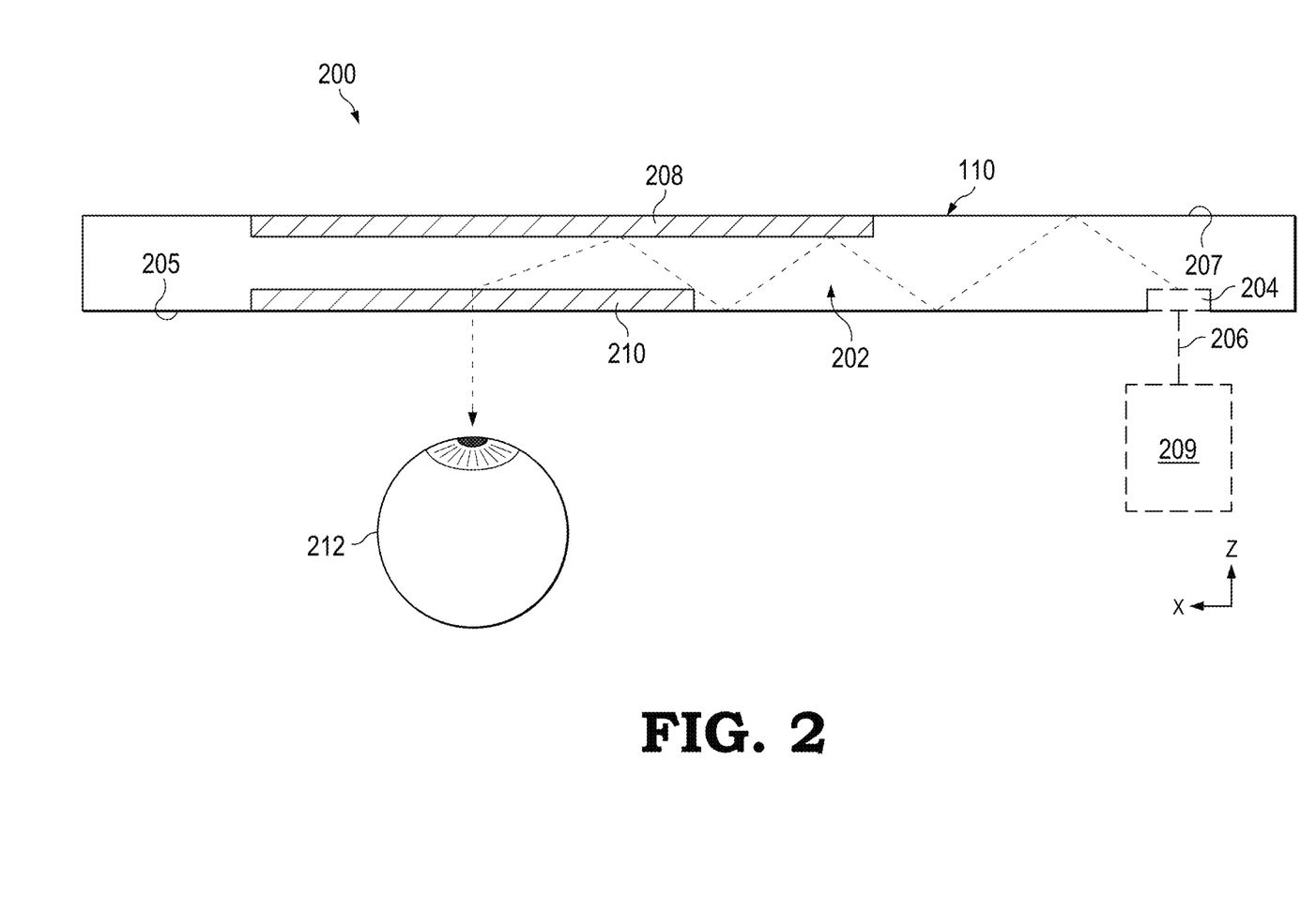
FIG. 2 is a diagram illustrating a cross-section view of an example implementation of a waveguide in accordance with some embodiments.

FIG. 2 depicts a cross-section view 200 of an implementation of a lens element 110 of a display system such as the display system 100 of FIG. 1. Note that for purposes of illustration, at least some dimensions in the Z direction are exaggerated for improved visibility of the represented aspects. In this example implementation, a waveguide 202, which may form a portion of the lens element 110 of FIG. 1, implements diffractive optical structures in a region 208 on the opposite side of the waveguide 202 as diffractive optical structures of a region 210. In particular, the reflective, refractive, or diffractive optical structures of an incoupler 204 are implemented on an eye-facing side 205 of the lens element 110. Likewise, the diffractive optical structures of region 210 (which provide outcoupler functionality) are implemented at the eye-facing side 205. Further in the illustrated implementation, the diffractive optical structures of region 208 (which provide EPE functionality) are implemented at a world-facing side 207 of the lens element 110 that is opposite the eye-facing side 205. Thus, under this approach, display light 206 from a light source 209 including components capable of pixel shifting a time-division multiplexed display to produce an increased perceived display resolution is incoupled to the waveguide 202 via the incoupler 204, and propagated (through total internal reflection in this example) toward the region 208, whereupon the optical structures of the region 208 diffract the incident display light for exit pupil expansion purposes, and the resulting light is propagated to the optical structures of the region 210, which output the display light toward a user's eye 212. Notably, to implement dichoptic displays with staggered quantization increments, one light engine and/or light source 209 will typically be used for each individual eye, although, in some implementations, a single controller may control both light sources 209. In other implementations, the positions of regions 208 and 210 may be reversed, with the diffractive optical structures of region 210 formed on the world-facing side 207 and the diffractive optical structures of region 208 formed on the eye-facing side 205, however, this may result in the regions 208 and 210 having different positions, dimensions, and shapes, and also may require diffractive optical structures in each region to have different characteristics.

Figure 3:
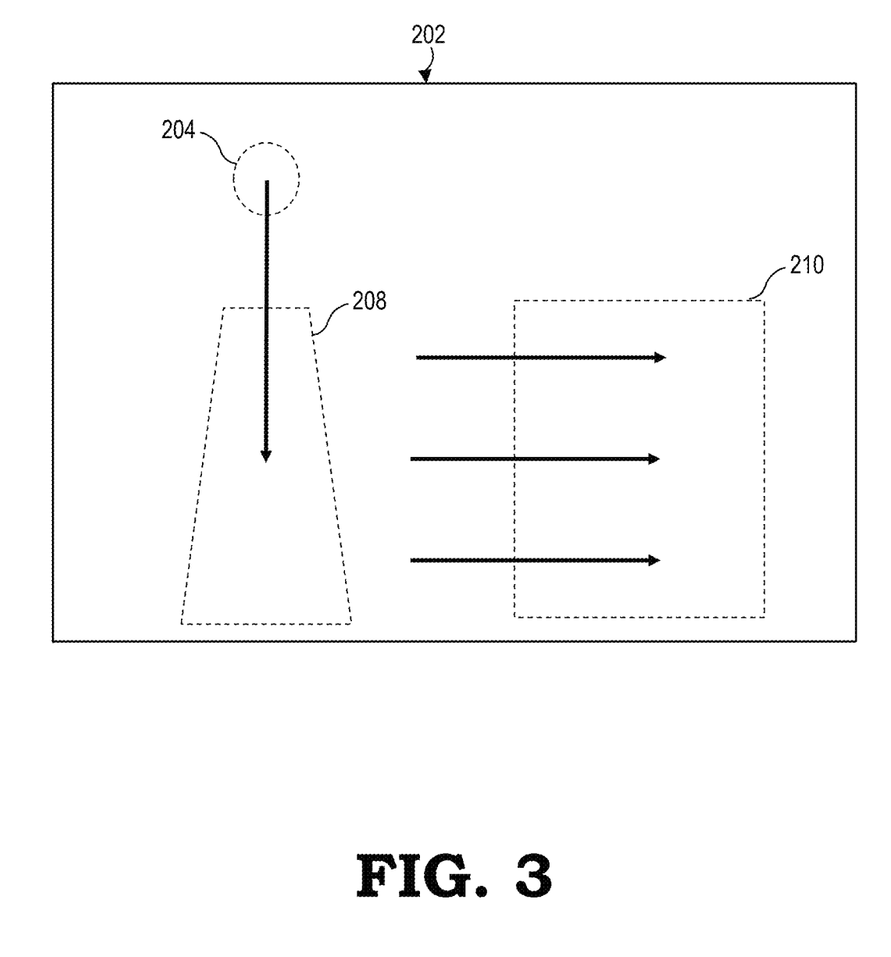
FIG. 3 shows an example of light propagation within a waveguide implementing a one-dimensional grating in accordance with some embodiments.

FIG. 3 shows an example of light propagation within the waveguide 202 of FIG. 2 when one-dimensional (1D) gratings are implemented in accordance with some embodiments. As shown, light received via the incoupler 204 is directed into the region 208 and then routed to the region 210 to be output (e.g., toward the eye 212 of the user). In some embodiments, region 208 expands one or more dimensions of the eyebox of a display system (e.g., the display system 100 of FIG. 1) that includes the light source 209 (e.g., with respect to what the dimensions of the eyebox of the display would be without the region 208). In some embodiments, the incoupler 204 and the region 208 each include respective 1D optical gratings (e.g., refractive, diffractive, or reflective gratings that extend along one dimension), which diffract incident light in a particular direction depending on the angle of incidence of the incident light and the structural aspects of the optical gratings. It should be understood that FIG. 3 shows a substantially ideal case in which the incoupler 204 directs light straight down (with respect to the presently illustrated view), and the region 208 directs light to the right (with respect to the presently illustrated view) in a second direction that is perpendicular to the first direction. While not shown in the present example, it should be understood that, in some embodiments, the first direction in which the incoupler 204 directs light is slightly or substantially diagonal.

In at least some embodiments, the region 208 and the region 210 are separated into or onto separate sections of the waveguide 202. For example, the incoupler 204 and the region 208 are located in or on a first section, and the region 210 is located in or on a second section, where a planar direction of the first section is substantially parallel to a planar direction of the second section. In some embodiments, the incoupler 204 and the region 208 are located in or on a first substrate, and the region 210 is located in or on a second substrate, where the first substrate and the second substrate are arranged adjacent to one another in the manners described herein.

The waveguide 202, in at least some embodiments, includes multiple substrates with the region 208 located in or on a first substrate and the region 210 located in or on a second substrate that is separate from and adjacent to the first substrate. In some embodiments, a partition element is placed between the first substrate and the second substrate. For example, the partition element is an airgap (or gas-filled gap), a low-index refractive material layer, a polarizing beam splitter layer, or any combination thereof. In at least some embodiments, the partition element includes additional elements or an opening to direct light from the first substrate to the second substrate.

Figure 4:
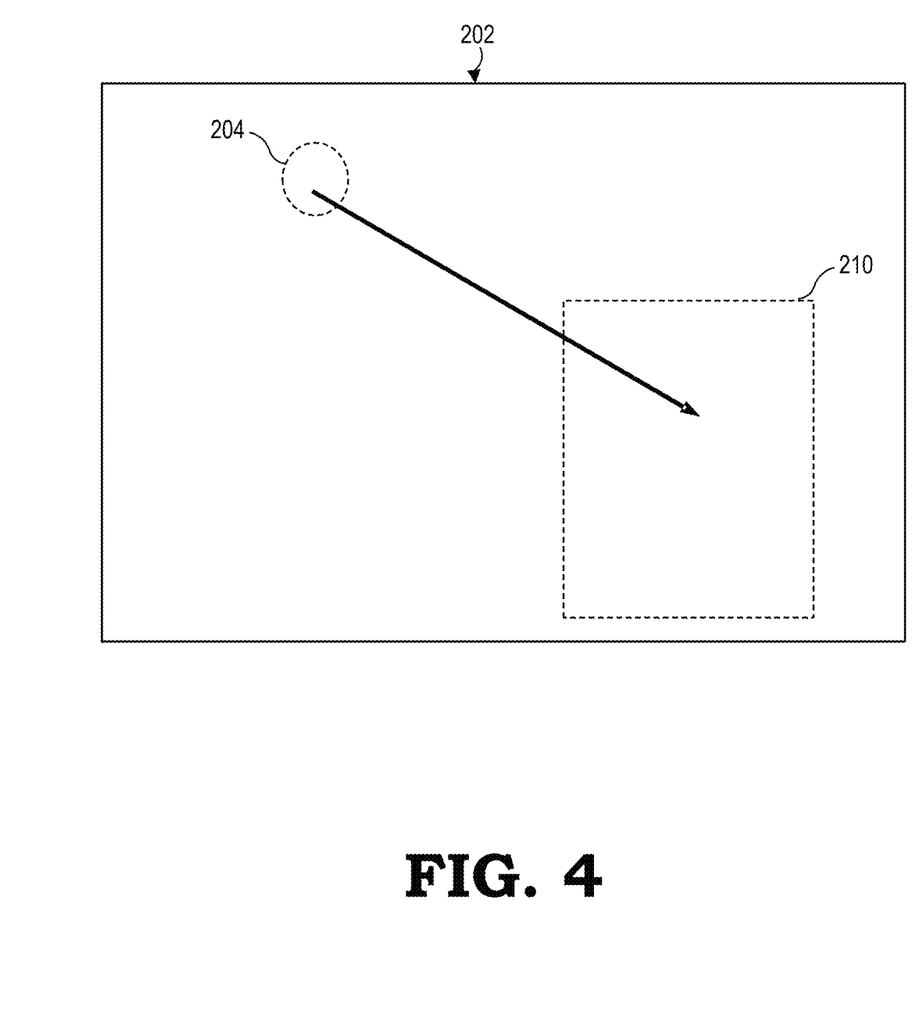
FIG. 4 shows an example of light propagation within a waveguide implementing a two-dimensional grating in accordance with some embodiments.

FIG. 4 shows another example of light propagation within the waveguide 202 of FIG. 2 when two-dimensional gratings (2D) are implemented in accordance with some embodiments. As shown, light received via the incoupler 204 is routed to the region 210 to be output (e.g., toward the eye 212 of the user). In the example shown in FIG. 4, the region 208 is not implemented by the waveguide 202 or is combined with the region 210. If the region 208 is combined with the region 210, the region 208 expands one or more dimensions of the eyebox of the display system as described above. In this example, the region 210 includes a 2D diffraction grating(s) (i.e., a diffraction grating(s) that extends along two dimensions), which diffracts incident light in a particular direction depending on the angle of incidence of the incident light and the structural aspects of the diffraction gratings.

However, using conventional display systems and particularly display systems that utilize waveguides like the waveguide 202 of FIG. 2 can be challenging. This is in part because processing elements and display elements such as light source 209 can generate substantial amounts of heat. Form factor considerations often limit the internal usable volume in the support structures of conventional display systems, which in turn limits the available space for heat dissipation components and other components. Calibration is typically required for display systems, particularly when waveguides are utilized, to compensate for undesirable characteristics or asymmetries of the display, such as color fringing. However, after performing such a calibration, the bit-depth of images the display is capable of producing can be significantly limited, as it may be necessary to give up some bit-depth to improve the quality of the display. Additionally, limited usable internal volume and heat dissipation considerations may limit the power or performance of light engines or light sources that can be embedded in the display. For example, it may be necessary in some implementations to utilize a 4-bit display or generally a lower bit-depth display than otherwise may be required to produce images of a desired quality.

Figure 5:
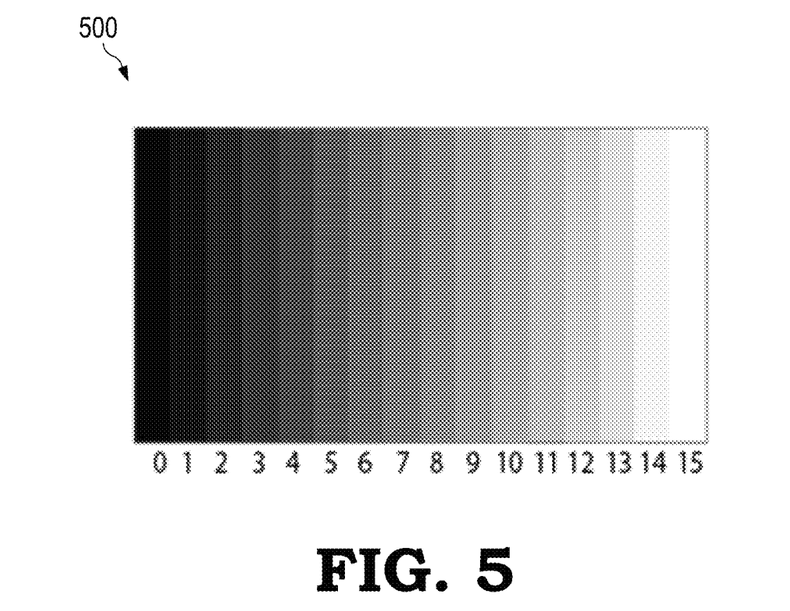
FIG. 5 shows an example diagram of various levels of gray that can be produced using a 4-bit display in accordance with some embodiments.

FIG. 5 shows an example diagram 500 of various levels of gray that can be produced using a 4-bit display in accordance with some embodiments. As shown in the diagram 500, a 4-bit display can produce up to 16 ($2^4$) levels of gray, typically varying from full intensity or opaque (labeled "0") to minimum intensity or transparent (labeled "15"). However, in some implementations, a higher bit-depth may be desired in order to produce images of a desired quality, e.g., to avoid "banding" in the display, which can result in distinct, abrupt transitions between luminances or intensities, creating bands or stripes instead of a smooth gradient. As described further hereinbelow, dichoptic displays with staggered quantization increments can be used to enhance perceived images through binocular fusion.

Figure 6:
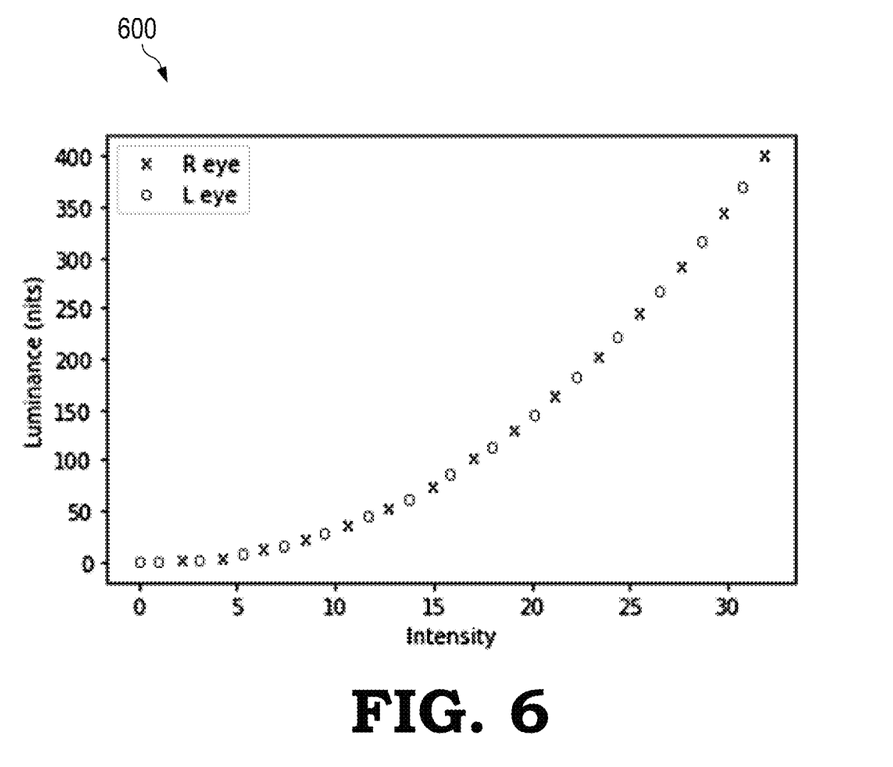
FIG. 6 shows an example graph of staggered quantization increments that can be used in dichoptic displays to enhance perceived images through binocular fusion in accordance with some embodiments.

FIG. 6 shows an example graph 600 of staggered quantization increments that can be used in dichoptic displays to enhance perceived images through binocular fusion in accordance with some embodiments. In particular, FIG. 6 illustrates how, in some embodiments, a first set of quantization increments associated with the right eye (labeled "R eye") is offset from a second set of quantization increments associated with the left eye (labeled "L eye"). Although FIG. 6 illustrates the quantization increments being offset from one another at approximately regular intervals, it is noted that irregular intervals can be advantageous when, e.g., higher bit-depth or resolution in brighter or darker portions of the images to be displayed are more common or important for a particular implementation.

By staggering the quantization increments used in a dichoptic display, such as the display system 100 of FIG. 1, a higher perceived bit-depth can be displayed. This is due to perceived binocular brightness being nearly identical to the perceived brightness experienced when viewing the higher of the two luminances binocularly, following a "winner take all" model. Thus, for example, by using a left-eye display with a first set of quantization increments and a right-eye display with a second set of quantization increments, where the first set of quantization increments is staggered with respect to the second set of quantization increments (as illustrated in the graph 600 of FIG. 6), two 4-bit displays can be used together to produce images with a higher perceived bit-depth than would be possible using two displays with identical quantization levels and increments.

For example, in some embodiments, for any desired luminance (or intensity) in the graph 600 of FIG. 6, a closest luminance to the desired luminance is selected from the plotted values and used for displaying the image for the eye with which that plotted value is associated (e.g., the left eye), and the next lower, adjacent plotted value is selected from the plotted values and used for displaying the image for the opposite eye (e.g., the right eye). Because perceived binocular brightness is nearly identical to the perceived brightness of the higher of two luminances binocularly, two 4-bit displays, one for each eye, with staggered quantization increments produce images with a higher perceived bit-depth than would otherwise be possible using two displays with identical quantization levels and increments.

Figure 7:
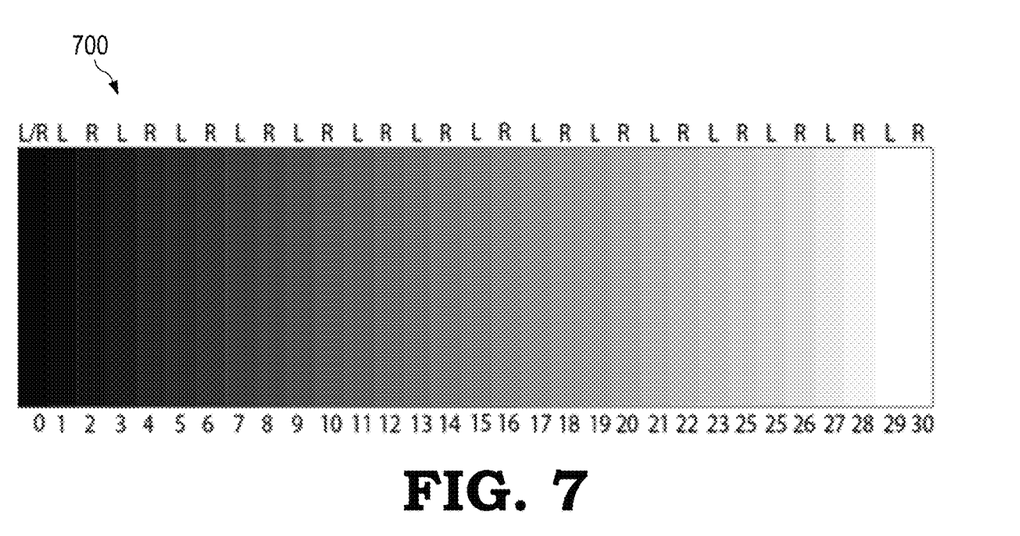
FIG. 7 shows an example diagram of various staggered quantization increments for levels of gray that can be used in dichoptic 4-bit displays to enhance perceived images through binocular fusion in accordance with some embodiments.

FIG. 7 shows an example diagram 700 of various staggered quantization increments for levels of gray that can be used in dichoptic 4-bit displays to enhance perceived images through binocular fusion in accordance with some embodiments. For example, in some embodiments, the levels of gray shown in the diagram 700 of FIG. 7 approximately correspond to the plotted values in the graph 600 of FIG. 6.

As shown, by using two 4-bit displays, one for each eye, with staggered quantization increments, up to approximately 31 levels of gray rather than being limited to displaying only the 16 levels of gray shown in the diagram 500 of FIG. 5, thus providing an enhancement of intensities of approximately 15 levels or "n−1" levels (where n is the number of quantization increments of each individual display) or a total of approximately 2n−1 levels of gray, thus approximately doubling the perceived intensities that would be possible without using staggered quantization increments.

Figure 8:
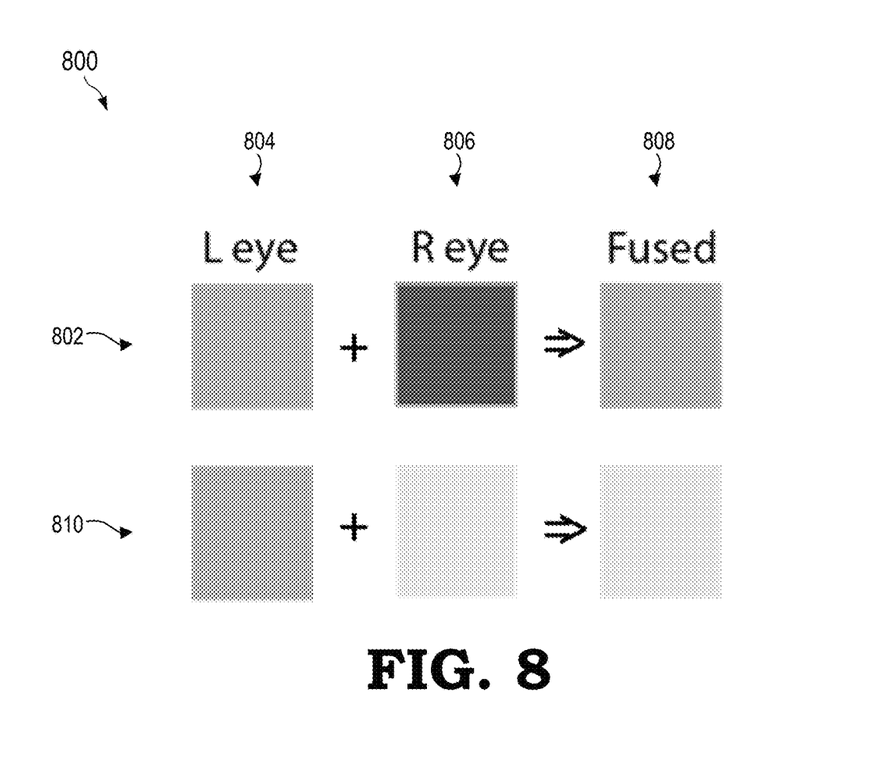
FIG. 8 shows examples of how staggered quantization increments can enhance perceived images through binocular fusion in a dichoptic display in accordance with some embodiments.

FIG. 8 shows examples 800 of how staggered quantization increments can enhance perceived images through binocular fusion in a dichoptic display in accordance with some embodiments. As shown in row 802, when a lighter gray (column 804) is presented to one eye (the left eye in the example of FIG. 8) and a darker gray (column 806) is presented to the opposite eye (the right eye in the example of FIG. 8), the perceived binocular brightness (column 808) is nearly identical to the brighter of the two (i.e., the lighter gray shown in row 802, column 804). Similarly, as shown in row 810, when a darker gray (column 804) is presented to one eye (the left eye in the example of FIG. 8) and a lighter gray (column 806) is presented to the opposite eye (the right eye in the example of FIG. 8), the perceived binocular brightness (column 808) is nearly identical to the brighter of the two (i.e., the lighter gray shown in row 810, column 806).

The use of dichoptic displays with staggered quantization increments to enhance perceived images through binocular fusion is not limited to enhancing perceived bit-depth related to luminance or intensity. As described further hereinbelow, the advantages of using staggered quantization increments in a dichoptic display can additionally or alternatively be used to enhance perceived bit-depth related to colors or chromaticities, in terms of enhancing the perceived bit-depth of an individual color and/or in terms of enhancing the perceived bit-depth of a mix of colors. However, human perception of dichoptic displays of color does not follow a "winner take all" model like that shown in FIG. 8 for general luminance. Instead, when two different colors are separately displayed to each eye, the colors are approximately averaged such that the user perceives a "middle" or "average" color between the two displayed colors, provided that the colors displayed to each eye are not so different that rivalry results in seeing both colors perceptually alternating. Accordingly, by appropriately leveraging the binocular fusion of colors and color intensities using staggered quantization increments in individual displays, it is possible to enhance the perceived bit-depth of an individual color and/or the perceived bit-depth of a mix of colors, e.g., to produce a greater number of colors than may be able to be displayed by an individual display using the same bit depth.

Figure 9:
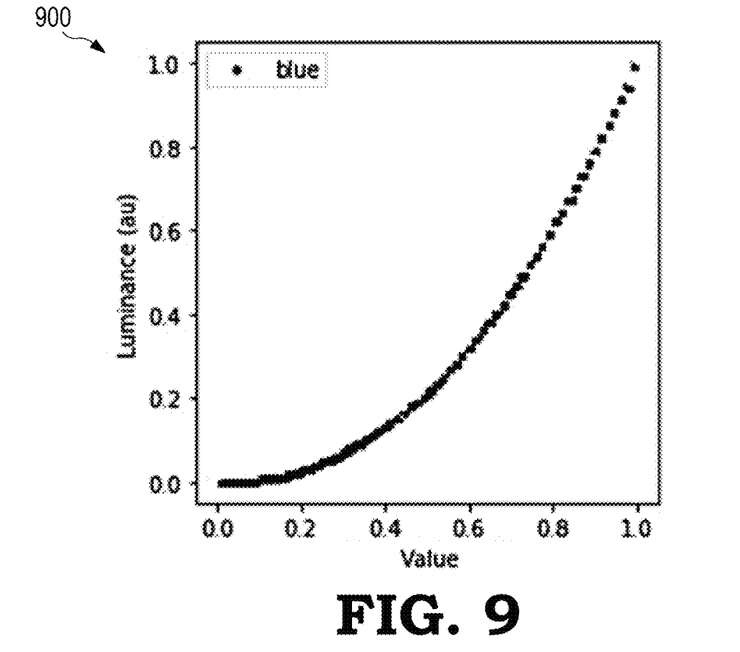
FIG. 9 shows an example graph of quantization increments for blue luminance with high bit-depth in accordance with some embodiments.

FIG. 9 shows an example graph 900 of quantization increments for blue luminance in a high blue-color bit-depth display in accordance with some embodiments. Although it will be appreciated that other scales or encodings can be used, as shown in the example graph 900, the values ranging from 0 to 1 identify or encode particular luminances of blue. As is evident from the graph 900, using the represented high blue-color bit-depth, a relatively high number of different luminances of blue can be displayed. However, after performing a calibration of the display, the bit-depth of blue luminances the display is capable of producing can be significantly limited, as it may be necessary to give up some bit-depth to improve the quality of the display.

Figure 10:
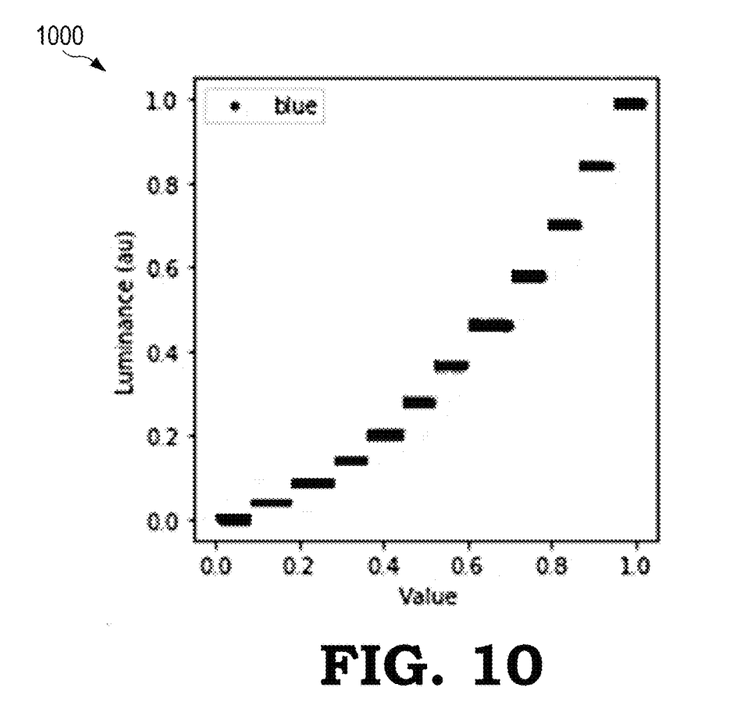
FIG. 10 shows an example graph of quantization increments for blue luminance with lower bit-depth than the bit-depth shown in FIG. 9 in accordance with some embodiments.

FIG. 10 shows an example graph 1000 of quantization increments for blue luminance in a lower blue-color bit-depth display than the high blue-color bit-depth display shown in FIG. 9 in accordance with some embodiments. Similarly to the calibration of general luminance described above with reference to FIG. 4, after performing a calibration of a display, the bit-depth of blue luminances the display is capable of producing can be significantly limited. Accordingly, when using a calibrated display, as shown in the graph 1000 of FIG. 10, only particular quantization increments of blue may be available for displaying images. This can result in "color banding" in the display, which can result in distinct, abrupt transitions between colors, creating bands or stripes instead of a smooth gradient. However, using similar techniques to those described above with respect to general luminance (e.g., as represented in the graph 600 of FIG. 6 showing staggered quantization increments for general luminance that can be used in dichoptic displays to enhance perceived images through binocular fusion), staggered quantization increments for luminances of particular colors can be used in dichoptic displays to enhance perceived images through binocular fusion.

Figure 11:
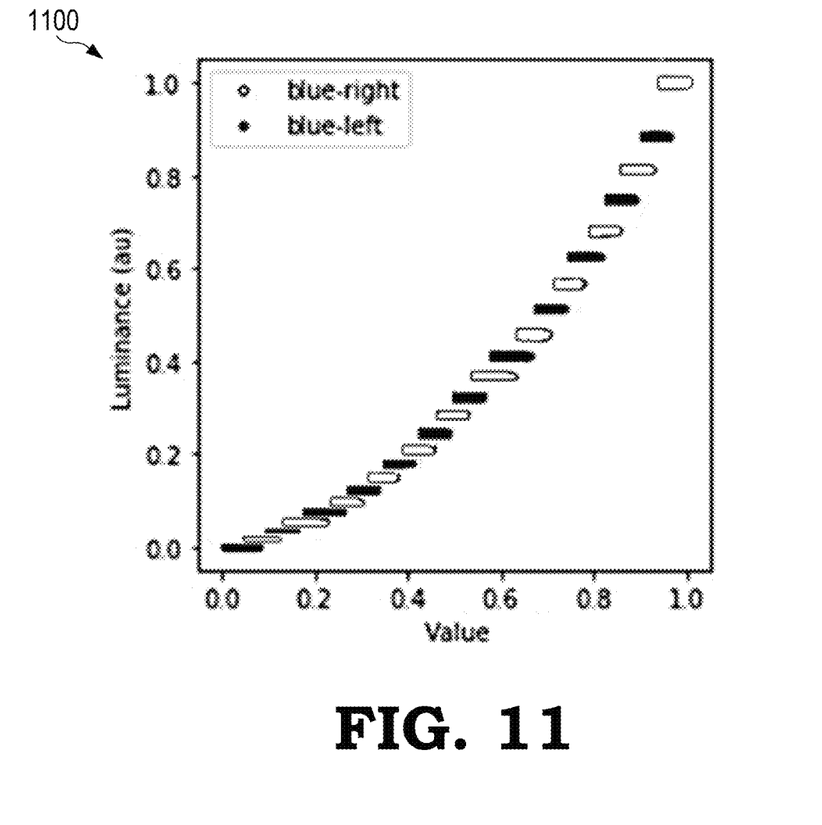
FIG. 11 shows an example graph of how staggered quantization increments for blue luminance can be used to enhance perceived images through binocular fusion in a dichoptic display in accordance with some embodiments.

FIG. 11 shows an example graph 1100 of how staggered quantization increments for blue luminance can be used to enhance perceived images through binocular fusion in a dichoptic display in accordance with some embodiments, although similar techniques can be used separately or simultaneously for other colors such as red and green. As shown in the graph 1100, in some embodiments, quantization increments for blue luminance in a display for a left eye are offset and staggered from quantization increments for blue luminance in a display for a right eye. Using such a configuration, the relatively limited number of quantization increments available to an individual one of the displays associated with one of the eyes can be enhanced through binocular fusion when different luminances of blue are provided to separate eyes. For example, in some embodiments, when a particular luminance of blue is desired to achieve a particular luminance or color in combination with other primary lights, such as red and green, but is not available based on the quantization increments of the displays or is only available to a single one of the displays for a single eye, two adjacent blue luminances plotted in the graph 1100 of FIG. 11 are selected for display to each different eye to produce a perceived image having approximately the desired colors and luminances.

As described further below with reference to FIG. 13, a similar technique to that described above with reference to FIG. 11 can be used to enhance the perceived bit-depth of a mix of colors. For example, by using staggered quantization increments for both red color and green luminances between displays for separate eyes, such that different luminances of red are available to each eye and different luminances of green are available to each eye, a perceived color bit-depth can be enhanced by appropriately combining a particular luminance of red in one eye with a slightly different luminance of red in the other eye while simultaneously combining a particular luminance of green in one eye with a slightly different luminance of green in the other eye. Using this technique, not only can a greater number of perceived luminances be achieved, but a higher resolution spectrum of colors can also be displayed.

For example, combining red light with green light produces yellow light, and when bit-depth is limited for a particular display, only certain chromaticities ranging from red to green can be displayed. However, in some embodiments, limited bit-depth displays are made to display a wider range of colors by using staggered quantization increments for red and green between displays for separate eyes by taking advantage of binocular fusion of the colors. For example, for a desired luminance and a desired color, even if the desired luminance is only available or approximately available on one display associated with one eye and the desired color is not available to either individual display associated with either eye, by combining offset color luminances between the displays for each eye, the colors can be combined to produce a perceived luminance close or equal to the desired luminance and a color close to the desired color.

Using techniques like those described herein for creating dichoptic displays with staggered quantization increments to enhance perceived images through binocular fusion can thus help to improve perceived displays in general dichoptic displays, and particularly in AR or MR devices utilizing waveguides. Additionally, by enabling a higher perceived bit-depth for luminance and/or chromaticity, data transfer requirements can be mitigated in embodiments where representations of a first image for display on a first display associated with a first eye and a second image for display on a second display associated with an opposite eye are received via a network connection. In some embodiments, thanks to the benefit of being able to produce higher perceived bit-depth perceived images from relatively lower bit-depth displays, the techniques described herein are utilized to reduce processing requirements, improve display characteristics, and/or minimize a form factor of a dichoptic display.

Figure 12:
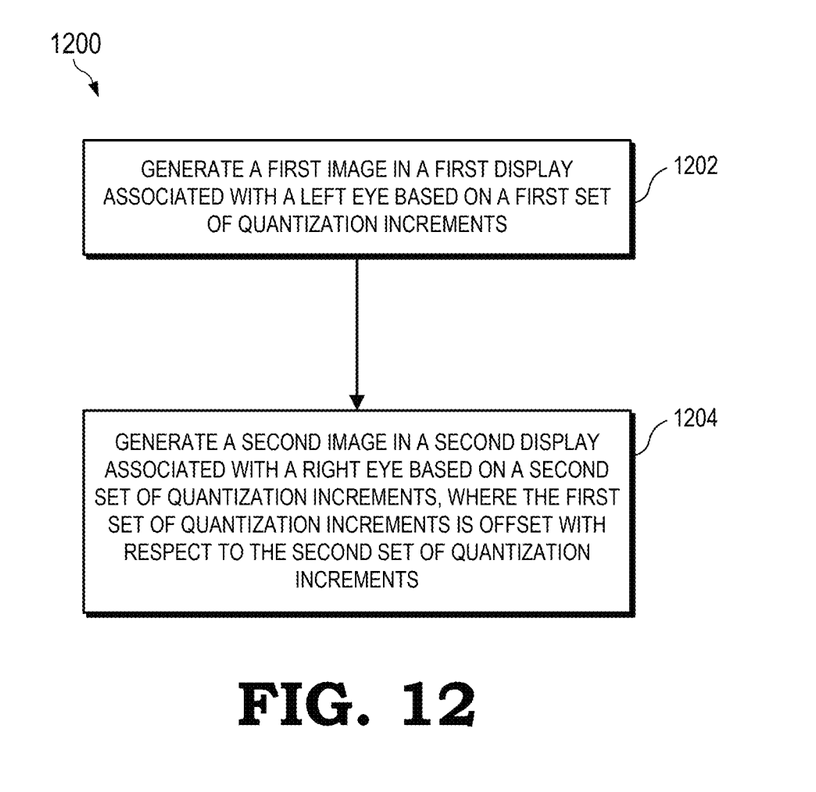
FIG. 12 shows an example method of enhancing perceived images through binocular fusion in a dichoptic display using offset quantization increments in accordance with some embodiments.

FIG. 12 shows an example method 1200 of enhancing perceived images through binocular fusion in a dichoptic display like that of FIG. 1 using offset quantization increments in accordance with some embodiments. At block 1202, a device such as the display system 100 of FIG. 1 generates a first image in a first display associated with a left eye of a user based on a first set of quantization increments. At block 1204, the device renders a second image in a second display associated with a right eye of the user based on a second set of quantization increments, where the first set of quantization increments is staggered or offset with respect to the second set of quantization increments. In some embodiments, the first and second sets of quantization increments correspond to luminances like those of graph 600 in FIG. 6. In some embodiments, the first and second sets of quantization increments correspond to colors or chromaticities like those of graph 1100 of FIG. 11. In some embodiments, the first and second sets of quantization increments correspond to blue luminances, like those of FIGS. 9-11. In some embodiments, the first set of quantization increments is offset from the second set of quantization increments at regular intervals. In some embodiments, the first display and the second display are associated with one or more waveguides, like waveguide 202 of FIG. 2, in an AR or MR display. In some embodiments, representations of the first image and the second image are received via a network connection, such as over the Internet and/or from a cloud or other remote server.

Figure 13:
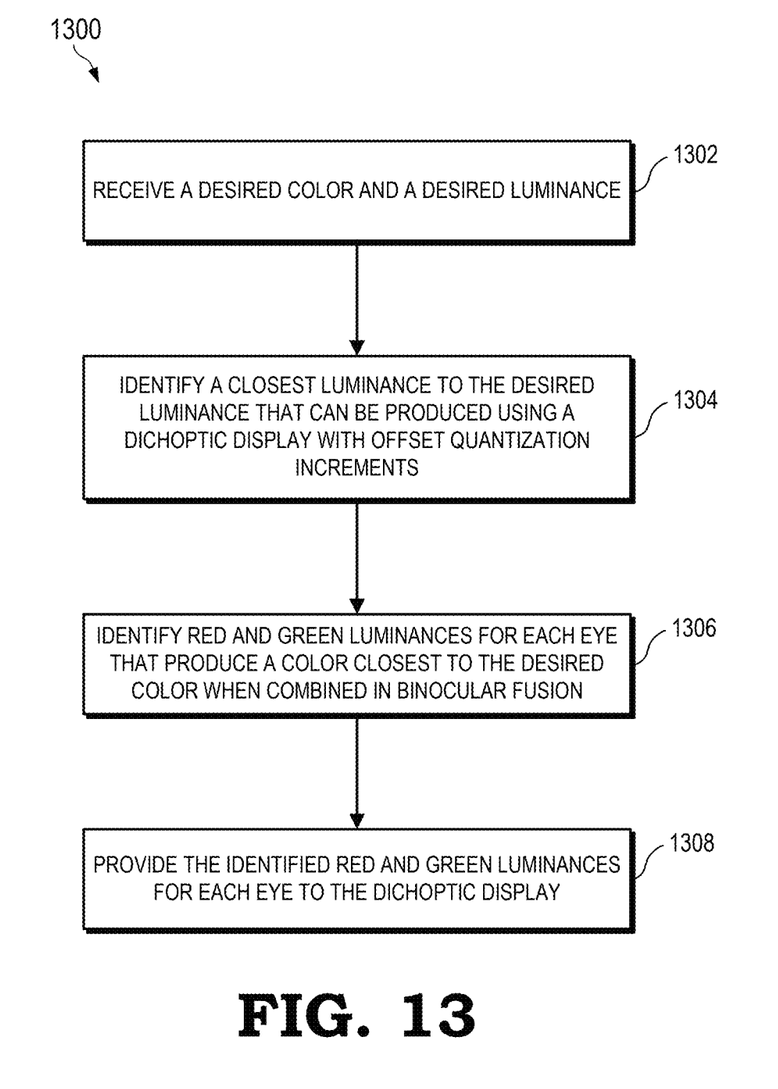
FIG. 13 shows an example method of enhancing perceived images through binocular fusion in a dichoptic display using offset quantization increments for red and green luminances in accordance with some embodiments.

FIG. 13 shows an example method 1300 of enhancing perceived images through binocular fusion in a dichoptic display like that of FIG. 1 using offset quantization increments for red and green luminances in accordance with some embodiments. At block 1302, a controller for a light engine controlling a light source, such as the light source 209 of FIG. 2, receives a desired color and a desired luminance from, e.g., software or hardware configured to display an image to a user through the dichoptic display. At block 1304, the controller identifies a closest luminance to the desired luminance that can be produced using the dichoptic display based on the offset quantization increments for red and green luminances. At block 1306, the controller identifies red and green luminances for each eye that produce a color closest to the desired color when combined in binocular fusion. At block 1308, the controller provides the identified red and green luminances for each eye to the left and right light engines of the dichoptic display.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head-mounted device (HMD), comprising:
    a first display associated with a left eye of a user, wherein the first display generates a first image based on a first set of quantization increments; and
    a second display associated with a right eye of the user, wherein the second display generates a second image based on a second set of quantization increments,
    wherein the first set of quantization increments is offset with respect to the second set of quantization increments.

2. The HMD of claim 1, wherein the first and second sets of quantization increments correspond to luminances.

3. The HMD of claim 2, wherein a first luminance selected from the first set of quantization increments is used for generating the first image and a next lower luminance from the first luminance, selected from the second set of quantization increments, is used for generating the second image.

4. The HMD of claim 2, wherein the first and second sets of quantization increments correspond to colors.

5. The HMD of claim 4, wherein a first color selected from the first set of quantization increments is used for generating the first image and a second color selected from the second set of quantization increments is used for generating the second image.

6. The HMD of claim 4, wherein the first and second sets of quantization increments correspond to blue luminances.

7. The HMD of claim 6, wherein a first luminance of blue selected from the first set of quantization increments is used for generating the first image and a next lower luminance of blue from the first luminance of blue, selected from the second set of quantization increments, is used for generating the second image.

8. The HMD of claim 1, wherein the first set of quantization increments is offset from the second set of quantization increments at approximately regular intervals.

9. The HMD of claim 1, wherein the first display and the second display are associated with one or more waveguides in an augmented reality (AR) or mixed reality (MR) display.

10. A method, comprising:
    generating a first image in a first display associated with a left eye of a user based on a first set of quantization increments; and
    generating a second image in a second display associated with a right eye of the user based on a second set of quantization increments,
    wherein the first set of quantization increments is offset with respect to the second set of quantization increments.

11. The method of claim 10, wherein the first and second sets of quantization increments correspond to luminances.

12. The method of claim 11, further comprising selecting a first luminance from the first set of quantization increments for generating the first image and selecting a next lower luminance from the first luminance from the second set of quantization increments for generating the second image.

13. The method of claim 11, wherein the first and second sets of quantization increments correspond to colors.

14. The method of claim 13, further comprising selecting a first color from the first set of quantization increments for generating the first image and selecting a second color from the second set of quantization increments for generating the second image.

15. The method of claim 13, wherein the first and second sets of quantization increments correspond to blue luminances.

16. The method of claim 15, further comprising selecting a first luminance of blue from the first set of quantization increments for generating the first image and selecting a next lower luminance of blue from the first luminance of blue from the second set of quantization increments for generating the second image.

17. The method of claim 10, further comprising offsetting the first set of quantization increments from the second set of quantization increments at approximately regular intervals.

18. The method of claim 10, wherein the first display and the second display are associated with one or more waveguides in an augmented reality (AR) or mixed reality (MR) display.

19. A method, comprising:
receiving a desired color for display by a dichoptic display with offset quantization increments;
identifying luminances for different colors for each eye of the dichoptic display that produce a color closest to the desired color when combined in binocular fusion; and
providing the identified luminances for each eye to the dichoptic display.

20. The method of claim 19, wherein the different colors are red and green.

* * * * *